(12) United States Patent  
Büttiker

(10) Patent No.: US 7,984,839 B2  
(45) Date of Patent: Jul. 26, 2011

(54) ULTRASONIC DEVICE WITH LONGITUDINAL AND TORSIONAL SONOTRODES

(75) Inventor: Albert Büttiker, Kirchberg/SG (CH)

(73) Assignee: Telsonic Holding AG., Bronschhofen (CH)

( * ) Notice: Subject to any disclaimer, the term of this patent is extended or adjusted under 35 U.S.C. 154(b) by 0 days.

(21) Appl. No.: 12/801,472

(22) Filed: Jun. 10, 2010

(65) Prior Publication Data

US 2010/0320257 A1 Dec. 23, 2010

(30) Foreign Application Priority Data

Jun. 18, 2009 (DE) .......................... 10 2009 027 021

(51) Int. Cl.
*B23K 1/06* (2006.01)
*B29C 65/00* (2006.01)

(52) U.S. Cl. .......................................... 228/1.1; 156/358
(58) Field of Classification Search .... 228/110.1–111.5, 228/1.1; 156/358, 580.2, 580.1, 64, 73.1–73.4
See application file for complete search history.

(56) References Cited

U.S. PATENT DOCUMENTS

| | | | | |
|---|---|---|---|---|
| 2,946,119 A | * | 7/1960 | Jones et al. | 228/110.1 |
| 3,017,792 A | * | 1/1962 | Elmore et al. | 228/1.1 |
| 3,039,333 A | * | 6/1962 | Jones et al. | 228/1.1 |
| 3,184,841 A | * | 5/1965 | Jones et al. | 228/110.1 |
| 3,319,984 A | * | 5/1967 | Jones et al. | 403/265 |
| 3,752,380 A | * | 8/1973 | Shoh | 228/1.1 |
| 4,867,370 A | * | 9/1989 | Welter et al. | 228/110.1 |
| 6,078,125 A | * | 6/2000 | Roberts | 310/325 |
| 6,168,063 B1 | * | 1/2001 | Sato et al. | 228/1.1 |
| 6,247,628 B1 | * | 6/2001 | Sato et al. | 228/1.1 |
| 6,612,479 B2 | * | 9/2003 | Popoola et al. | 228/110.1 |
| 6,811,630 B2 | * | 11/2004 | Tominaga et al. | 156/73.1 |
| 7,392,923 B2 | * | 7/2008 | Stroh et al. | 228/1.1 |
| 7,600,664 B2 | * | 10/2009 | Dieterle et al. | 228/1.1 |
| 2003/0201053 A1 | * | 10/2003 | Young | 156/73.1 |
| 2008/0128471 A1 | * | 6/2008 | Eberbach et al. | 228/1.1 |
| 2010/0170935 A1 | * | 7/2010 | Stroh et al. | 228/110.1 |

* cited by examiner

*Primary Examiner* — Kiley Stoner
*Assistant Examiner* — Carlos Gamino
(74) *Attorney, Agent, or Firm* — Manabu Kanesaka

(57) ABSTRACT

An ultrasonic welding device for welding two components has a rod-shaped first sonotrode for the generation of longitudinal waves and is coupled on its first end to a first converter and on its second end opposite the first end to a second converter. A first welding surface is provided in the middle of the first sonotrode. To improve durability and welding performance, a second sonotrode which is coupled to at least one third converter and is configured as a torsion sonotrode, has a second welding surface arranged opposite the first welding surface. The first and second sonotrodes can be moved relatively to each other such that a clamping force between the first and the second welding surface can be applied to the components to be connected.

9 Claims, 2 Drawing Sheets

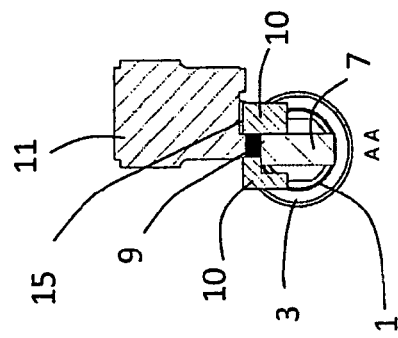
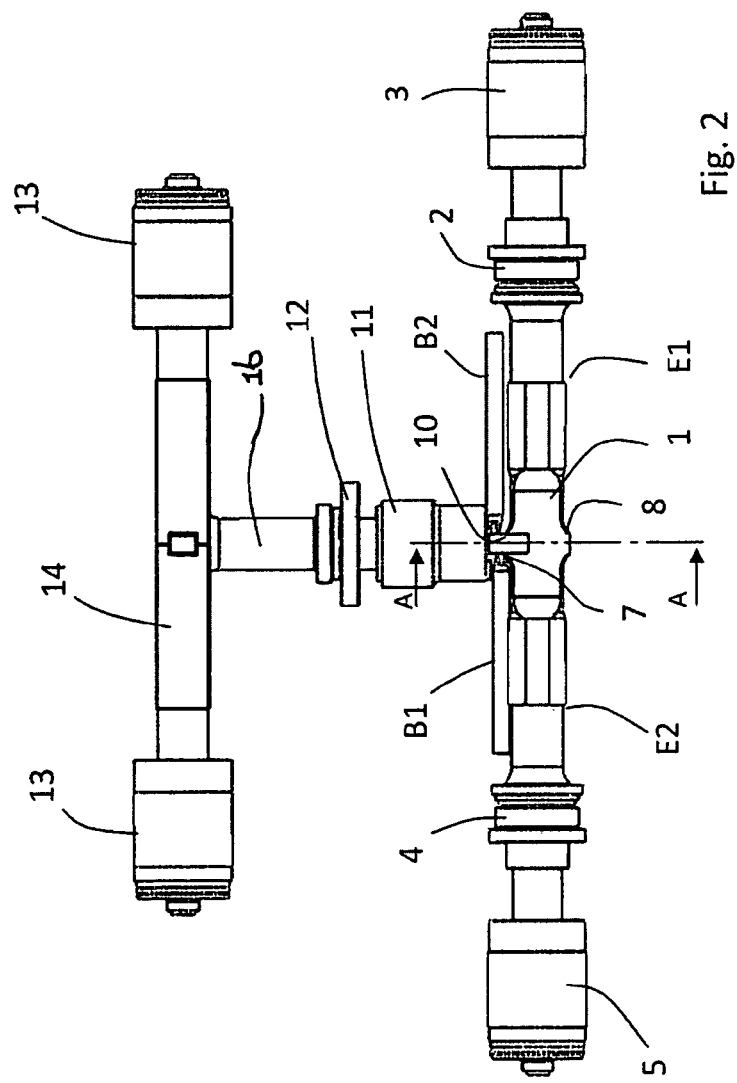

ULTRASONIC DEVICE WITH LONGITUDINAL AND TORSIONAL SONOTRODES

RELATED APPLICATIONS

The present application claims the priority of German Application No. 10 2009 027 021.3 filed Jun. 18, 2009, the disclosure of which is hereby incorporated by reference herein in its entirety.

BACKGROUND OF THE INVENTION AND RELATED ART STATEMENT

The invention relates to an ultrasonic welding device.

The invention generally relates to the field of ultrasonic welding. In particular, it relates to the field of ultrasonic welding of metallic components. In this connection, an ultrasonic oscillation is introduced parallel to a welding surface, wherein a welding force is also exerted perpendicularly at the same time. The ultrasonic oscillation makes it possible to tear open and displace the contamination and layers of oxide which are usually present on metal surfaces. The direct contact with the clean surfaces resulting from this leads to a lasting, firmly bonded connection of the metallic components.

An ultrasonic welding device is known from U.S. Pat. No. 3,039,333. There, a rod-shaped sonotrode is coupled to two converters via couplers extending radially away. The sonotrode of this device has not proven to be especially durable 1. An ultrasonic welding device for welding two components (B1, B2), wherein a rod-shaped first sonotrode (1) for the generation of longitudinal waves (W1) is coupled on its first end (E1) to a first converter (3) and on its second end (E2) opposite the first end (E1) to a second converter (5), wherein a first welding surface (9) is provided in the middle of the first sonotrode (1) is known.

SUMMARY OF THE INVENTION

An object of the invention is to eliminate the disadvantages of the prior art. In particular the present invention is directed to an ultrasonic welding device which is as durable as possible and further directed to a method with which especially high power can be introduced in a welding area and used to weld thick-walled and/or large-surface components together.

According to the provisions of the invention, it is provided that a second sonotrode which is coupled to at least one third converter and which is configured as a torsion sonotrode has a second welding surface arranged opposite the first welding surface, and wherein the first and the second sonotrodes are relatively moveable against each other so that a welding force can be applied between the first and the second welding surface to the components to be connected. —The power transferred to the components to be welded can be significantly increased with the suggested ultrasonic welding device. In particular, with this, thick-walled components can also be connected by ultrasonic welding. A further advantage of the suggested ultrasonic welding device is that the torsion sonotrode can only be moved with a vertical movement, i.e. without horizontally directed movements, against the first sonotrode for welding the components. Such a movement can be performed easily and quickly. A vertical movement unit required for this is easy and inexpensive to provide. This can increase the production speed for components to be connected with each other.

According to an advantageous embodiment of the invention, the first, second and third converters are connected to the first generator. But it can also be that the first and the second converters are connected to the first generator and the at least one third converter is connected to a second generator. If several third converters are provided, these can also be connected to the second generator.

The first and the second converters are operated inversely to each other with a phase shift of $\lambda/2$ so that the first sonotrode oscillates in a longitudinal direction. In this connection, the first converter can be coupled via a first booster and the second converter can be coupled via a second booster to the first sonotrode. The amplitude of the longitudinal oscillation can be adjusted by providing the boosters.

In an advantageous arrangement, the first welding surface is provided on an anvil-like projection provided in the middle of the first sonotrode. The first sonotrode is advantageously designed symmetrically, i.e., in reference to a horizontal symmetry plane, a further anvil-like projection is provided on the first sonotrode opposite the anvil-like projection. With the suggested embodiment of the first sonotrode, a particularly great amount of power output on the components to be welded together can be achieved.

According to a further embodiment of the invention, a clamping device for clampingly holding of at least one component to be welded is provided on the first welding surface. The clamping device can comprise two clamping jaws being movable essentially perpendicular to the direction of expansion of the longitudinal waves in the first sonotrode. The provision of such a clamping device has proven particularly good for the connection of a braid with a connection element. The braid can, for example, be held on the first welding surface using the clamping device.

According to an advantageous embodiment, the second sonotrode is coupled via a third booster to the at least one third converter. The provision of the third booster makes it possible to adjust the amplitude of the second sonotrode.

According to a particularly advantageous embodiment of the invention, the second welding surface is arranged eccentrically on the second sonotrode. The "eccentrically" arranged second welding surface is located outside an axis around which the torsion electrode oscillates. The second welding surface can be in particular a radial, outer ring surface section on a free end of the torsion electrode. Due to this, the second welding surface oscillates as it were in a "longitudinal" direction. The first and the second welding surface are advantageously arranged relative to each other so that they oscillate in the same "longitudinal" direction. In this connection, the converters are controlled, however, so that the oscillations generated by the first and second sonotrodes are opposite each other. The second welding surface can also be designed in the shape of a ring.

The first sonotrode can be arranged permanently with reference to a base and the second sonotrode can be movable relative to this in a vertical direction. For this purpose, the second sonotrode can be attached to a movement unit with which it can be moved for the application of the welding force against the first sonotrode.

For further increasing the power, it can be provided that the second sonotrode is coupled to four third converters which are connected in pairs via one common sonic transmission element, respectively, to the second sonotrode. In this connection, it is useful that the third converters are connected to a second generator for the generation of ultrasonic waves. In case that two third converters are respectively arranged in pairs, they can be operated inversely to each other similar to the first and the second converters.

According to the provisions of the method of the invention, the following steps are provided for the connection of two components by ultrasonic welding:

providing of the ultrasonic welding device provided by the invention, pressing the components to be welded between the first and the second welding surfaces, and generating ultrasonic waves by the first, second and third converters so that the components to be welded are welded together.

According to an embodiment of the alternate version of the method, the first and the second converters—on the one hand—can be operated in a first cycle and the third converters—on the other hand—can be operated in a second consecutive cycle. But it is also possible to operate the first, second and third converters simultaneously.

BRIEF DESCRIPTION OF THE DRAWINGS

The invention will now be described in more detail using an example based on the drawing. It is shown:

FIG. 2 a side view as per FIG. 1 and

FIG. 3 a sectional view as per intersecting line A-A in FIG. 2.

DETAILED DESCRIPTION OF PREFERRED EMBODIMENTS

Figure 1:
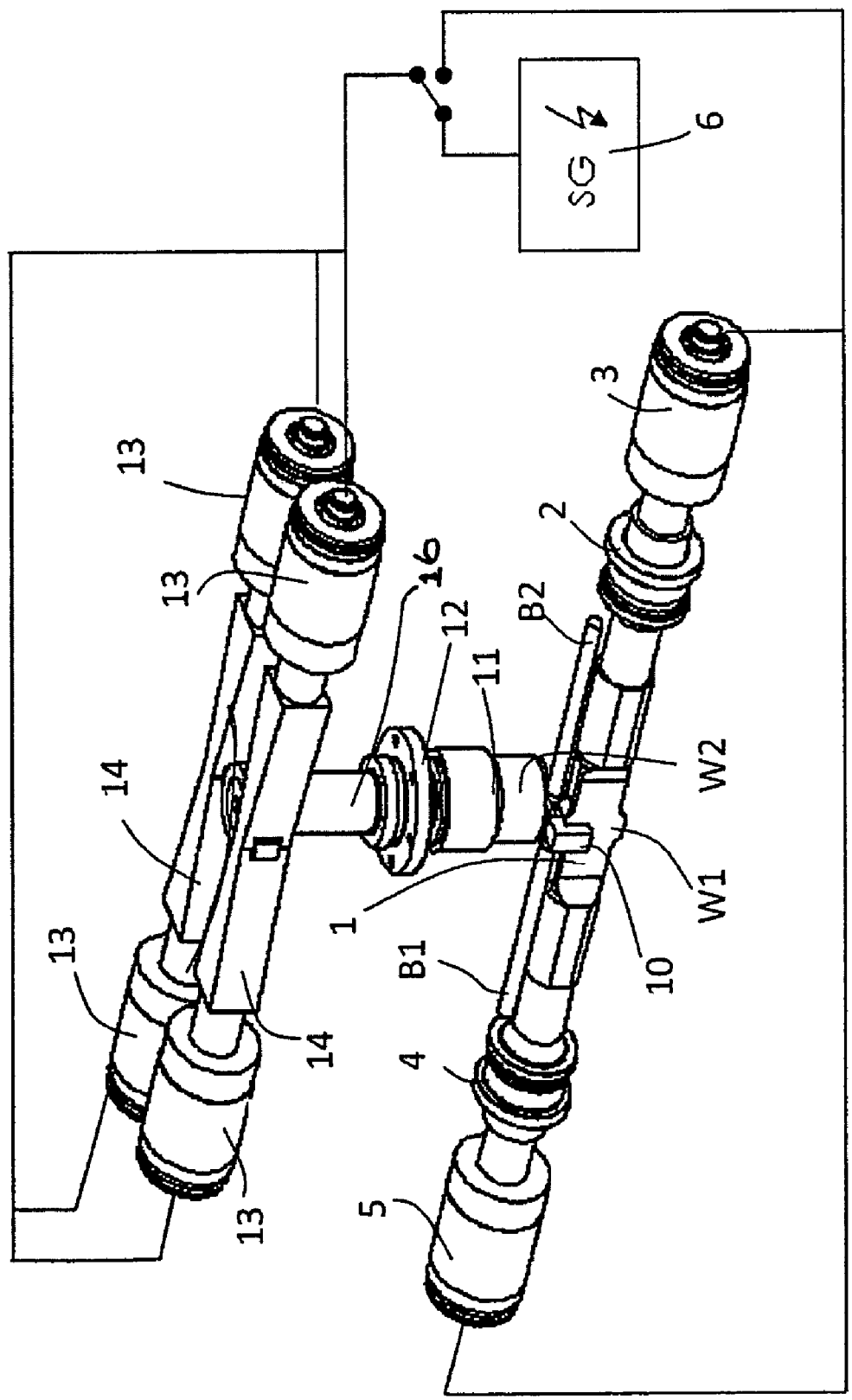
FIG. 1 a view in perspective of an ultrasonic welding device.

The figures show an ultrasonic welding device for welding of two metallic components B1, B2, for example, two braids having a diameter of more than 8 mm. A rod-shaped first sonotrode 1 is connected on its first end E1 via interposition of a first booster 2 to a first converter 3. A second end E2 of the first sonotrode 1 is connected to a second converter 5 via interposition of a second booster 4. The arrangement is symmetrical with regard to a median plane. The median plane corresponds to intersecting line A-A in FIG. 2. The first converter 3 and the second converter 5 can be operated together with a first generator 6. Due to this, the longitudinal waves W1 are impressed on the first sonotrode 1.

As is particularly shown in FIGS. 2 and 3, the first sonotrode 1 has an anvil-like projection 7 in its middle and a symmetrical counter projection 8 located opposite. The projection 7 is provided with an even welding surface 9 on which the metallic components B1, B2 to be welded are placed. Reference sign 10 denotes clamping jaws of a (not shown in more detail here) clamping device which can be moved back and forth perpendicularly to the direction of expansion of the longitudinal waves W1.

To generate particularly high power, a second sonotrode arrangement is provided instead of an anvil in the exemplary embodiment shown. In this connection, a second sonotrode 11 is coupled via a third booster 12 to two third converters 13 arranged in pairs, respectively. Two third converters 13 are respectively coupled together via a transmission element 14. The transmission elements 14 are tangentially coupled to a torsion rod 16 extending from the third booster 12 in an arrangement opposite each other.

Two third converters 13 connected with each other via a transmission element 14 can—similar to the first converter 3 and the second converter 5—be operated inversely to each other with a phase shift of $\lambda/2$ so that the transmission element 14 oscillates in a longitudinal direction. The opposite pair of third converters 13 is in turn designed so that it oscillates in the opposite direction from the other pair so that the torsion waves W2 are impressed on the second sonotrode 11.

FIG. 3 shows a second welding surface designated as reference sign 15 which is provided eccentrically on the second sonotrode 11.

The function of the ultrasonic welding device is as follows:

To weld two braids B1, B2 made of aluminum, for example, these are placed on top of each other on the first welding surface 9. Then the clamping jaws 10 are moved against each other and the braids B1, B2 on top of one another are fixated on the first welding surface 9. Then the second sonotrode 11 is moved vertically and placed on the first sonotrode 1 in such a manner that the first 9 and the second welding surfaces 15 are located approximately opposite each other. A specified welding force or a specified pressure is applied to the braids B1, B2 which are located on top of each other.

Then the first generator 6, for example, is operated in such a manner that—on one hand—the first converter 3 and the second converter 5 and—on the other hand—the third converters 13 are operated alternately. But it can also be that the first converter 3 and the second converter 5 are operated together by a first generator 6 and the third converters 13 are operated by a second generator (not shown here).

The first 6 and/or the second generators can have a power in the range of 15 to 20 KW. It has been shown to be useful to operate sonotrodes 1, 11 with a frequency in the range of 15 and 20 kHz. In this connection, amplitudes between 20 and 150 μm are generated on welding surfaces 9, 15.

Although the preceding exemplary embodiment has been discussed based on the connection of two metallic components, the suggested ultrasonic welding device is also suitable for connecting components made of plastic.

LIST OF REFERENCE SIGNS

1 First sonotrode
2 First booster
3 First converter
4 Second booster
5 Second converter
6 First generator
7 Projection
8 Counter projection
9 First welding surface
10 Clamping jaws
11 Second sonotrode
12 Third booster
13 Third converter
14 Transmission element
15 Second welding surface
16 Torsion rod
B1 First component
B2 Second component
E1 First end
E2 Second end
W1 Longitudinal wave
W2 Torsion wave

The invention claimed is:

1. An ultrasonic welding device for welding two components comprising:
   first and second converters,
   a rod-shaped first sonotrode for generation of longitudinal waves coupled on its first end to the first converter and on its second end opposite the first end to the second converter, wherein a first welding surface is provided in a middle of the first sonotrode, at least one pair of third converters, and a second sonotrode which is coupled via a third booster with the at least one pair of third converters coupled together via a transmission element being tangentially coupled to a torsion rod extending from the third booster, the second sonotrode being configured as a torsion sonotrode having a second welding surface arranged opposite the first welding surface, wherein the first sonotrode and the second sonotrode are relatively movable against each other such that a welding force can be applied between the first and the second welding surface to the components to be welded together.

2. The ultrasonic welding device as defined in claim 1, wherein the first, second and third converters are connected to at least one first generator for generation of ultrasonic waves.

3. The ultrasonic welding device as defined in claim 1, wherein the first and the second converters are connected to a first generator.

4. The ultrasonic welding device as defined in claim 1, wherein the first converter is coupled via a first booster and the second converter is coupled via a second booster to the first sonotrode.

5. The ultrasonic welding device as defined in claim 1, wherein the first welding surface is provided on an anvil-like projection provided in a middle of the first sonotrode.

6. The ultrasonic welding device as defined in claim 1, wherein a clamping device for clampingly holding of at least one of the components to be welded is provided on the first welding surface which comprises two clamping jaws being movable essentially perpendicular to a direction of expansion of the longitudinal waves in the first sonotrode.

7. The ultrasonic welding device as defined in claim 1, wherein the second welding surface is arranged eccentrically on the second sonotrode.

8. The ultrasonic welding device as defined in claim 1, further comprising a second pair of third converters wherein the second pair of the third converters are coupled together via a second transmission element, which is tangentially coupled to the torsion rod extending from the third booster.

9. The ultrasonic welding device as defined in claim 8, wherein the two pairs of the third converters connected with each other via the transmission elements, are arranged to be operated inversely to each other with a phase shift of $\lambda/2$ so that the transmission elements oscillate in opposite longitudinal directions and torsion waves are impressed on the second sonotrode.

* * * * *